March 1, 1966

F. L. CLARK ETAL 3,238,345

HYPERSONIC TEST FACILITY

Filed March 18, 1963

INVENTORS
FRANK L. CLARK
CHARLES B. JOHNSON
WAYNE D. ERICKSON
ROGER I. BUCHANAN

BY

*G.D.O'Brien*
*Wallace J. Nelson*
ATTORNEYS

March 1, 1966     F. L. CLARK ETAL     3,238,345
HYPERSONIC TEST FACILITY
Filed March 18, 1963     4 Sheets-Sheet 4
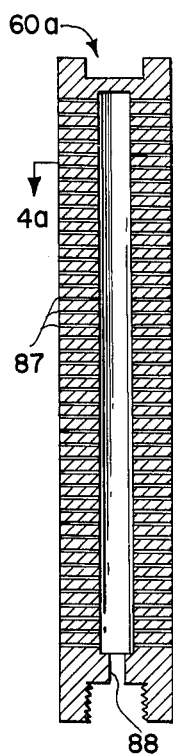
FIG. 4a
FIG. 4
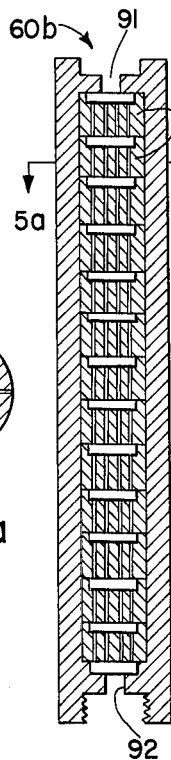
FIG. 5a
FIG. 5
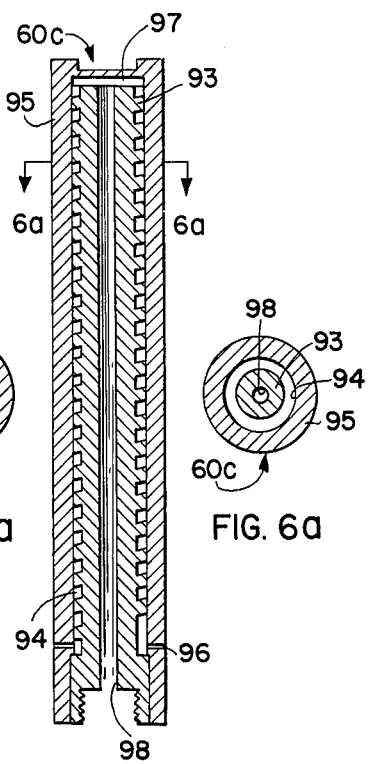
FIG. 6a
FIG. 6
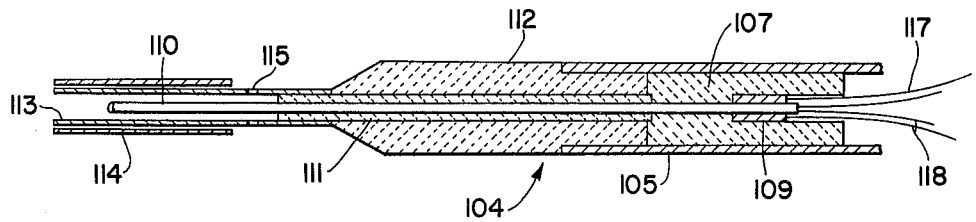
FIG. 7
INVENTORS
FRANK L. CLARK
CHARLES B. JOHNSON
WAYNE D. ERICKSON
ROGER I. BUCHANAN
BY
ATTORNEYS United States Patent Office 3,238,345
Patented Mar. 1, 1966

3,238,345
HYPERSONIC TEST FACILITY
Frank L. Clark, Hampton, Charles B. Johnson, Newport News, Wayne D. Erickson, Hampton, and Roger I. Buchanan, Yorktown, Va., assignors to the United States of America as represented by the Administrator of the National Aeronautics and Space Administration
Filed Mar. 18, 1963, Ser. No. 266,107
7 Claims. (Cl. 219—10.49)
(Granted under Title 35, U.S. Code (1952), sec. 266)

The invention described herein may be manufactured and used by or for the Government of the United States for governmental purposes without the payment of any royalties thereon or therefor.

This invention relates generally to a hypersonic test facility for ablation studies and other testing of prototype aeronautic and space vehicles and parts thereof under high pressure, high temperature conditions, and relates with particularity to a heat exchange assembly in a hypersonic test facility which has the capability of heating a test gas medium under high pressure from room temperature to an exist or stagnation temperature in the range of from 3,000° R. to 4,000° R., with the further capability of continuous operation for a period of 15 minutes or more while maintaining a steady-state high-exit gas temperature.

In general, all hypersonic test facilities, which employ a flow medium such as nitrogen or air, must heat the fluid to a sufficiently high temperature, prior to an expansion of the fluid down the nozzle, so that liquefaction thereof will not occur in the test section of the facility. In order to simulate and study problems associated at hypersonic speeds in the Mach number range from 12–20, the working fluid must necessarily be heated to extremely high temperatures. The presently known heat exchangers which are capable of generating high-exit gas stagnation temperatures which produce hypersonic flow in the Mach number range from 12–20, and that are capable of sustained periods of operation for several minutes, generally fall into two categories, that is, electrical arc heaters and ceramic heaters. Due to the high temperatures at which the heater elements in these exchangers must operate, erosion and vaporization of the internal components of the exchanger results, and the subsequent contamination of the hot exit fluid becomes a matter of major concern. In addition, great difficulty has been encountered in maintaining a stable arc in the electrical arc heater at high pressures. Also, the existing possibility in both of these types of prior art facilities of having fluctuations in the stagnation conditions during a given operating period is disadvantageous.

Other known facilities which have capable operating high Mach numbers are the "hot-shot" type facility, and the shock-tube type, both types of which have operating times only on the order of from 20 to 50 milliseconds. Because of this extremely short operating period, design and construction of adequate data-gathering and recording equipment becomes a major problem. Additionally, these short-operating-time facilities completely eliminate the possibility of conducting any type of ablation studies. the present invention attempts to combine the advantageous features of the aforementioned prior art facilities while minimizing the disadvantages thereof.

Accordingly, an object of the present invention is to provide a new and improved hypersonic test facility.

An additional object of the instant invention is the provision of the hypersonic test facility capable of continuous operation for sustained periods of time while maintaining a steady-state high-exit gas temperature.

Another object of this invention is to provide a novel hypersonic test facility producing a high temperature fluid medium which is relatively free of contamination.

A further object of the present invention is the provision of a novel hypersonic test facility capable of test speeds in the Mach number range from 12–20 which is relatively free from erosion and contamination in the test fluid.

Still another object of the instant invention is the provision of an efficient high-temperature heat exchanger having a capability of heating a fluid medium under a pressure of 5,000 p.s.i. from room temperature to an exit temperature of approximately 3,000° R.–4,000° R. over a relatively short distance.

A still further object of the present invention is the provision of a hypersonic test facility where aerodynamic testing can be conducted in high Mach number environment for sustained periods of time.

In accordance with the present invention, the foregoing and other objects are attained by flowing a test medium through a unique graphite heater contained within a pressure chamber having a design pressure of approximately 5,000 p.s.i., and supplying heat to the test medium by the principle of induction heating through the use of suitable water-cooled induction heating coils positioned about the heater element and in connection with a suitable power supply. One end of the graphite heater is in fluid connection with a high pressure inert fluid source, such for example, nitrogen gas, and provided with suitable controls for maintaining the desired pressure flow through the heater. The other end of the graphite heater leads into a water-cooled expansion nozzle connected to a cylindrical test section within which a test model is positionable. The test section is equipped with conventional offset schlieren windows to enable visual and photographic inspection of the model during a test operation. The other end of the test section through which the gas passes leads through a straight-type diffuser to a conventional vacuum system. Suitable conventional mechanism, such for example, a conventional sliding sting mount means, is provided for selectively positioning a model within the test section. In a test operation, a model is suitably positioned within the test chamber and the gas from the high-pressure source is permitted to flow into the pressure chamber through the graphite heater element wherein it is heated to the stagnation temperature level desired. The graphite heater element, through which the test fluid passes, is heated to a high temperature by the principle of induction heating. After the test fluid has passed through the hot graphite heater element, it is expanded through a water-cooled convergent-divergent nozzle to the test section of the facility.

A more complete appreciation of the invention and many of the attendant advantages thereof will be readily apparent as the same becomes better understood by reference to the following detailed description when considered in connection with the accompanying drawings wherein:

FIG. 4 is a longitudinal sectional view of a modification of a graphite heater element useful in the pressure chamber of the present invention;

FIG. 4–a is a cross sectional view of the graphite element shown in FIG. 4 taken along the line 4a—4a;

FIG. 5 is a longitudinal sectional view of another modified graphite heater element;

FIG. 5a is a cross sectional view of the heater element shown in FIG. 5 taken along line 5a—5a;

FIG. 6 is still another modification showing a longitudinal sectional view of a graphite heater element useful in the present invention;

FIG. 6a is a cross sectional view of the heater element shown in FIG. 6 taken along the line 6a—6a; and FIG. 7 is a sectional view of a thermocouple element utilizable with the hypersonic test facility of the present invention for the determination of stagnation temperatures therein.

Figure 1:
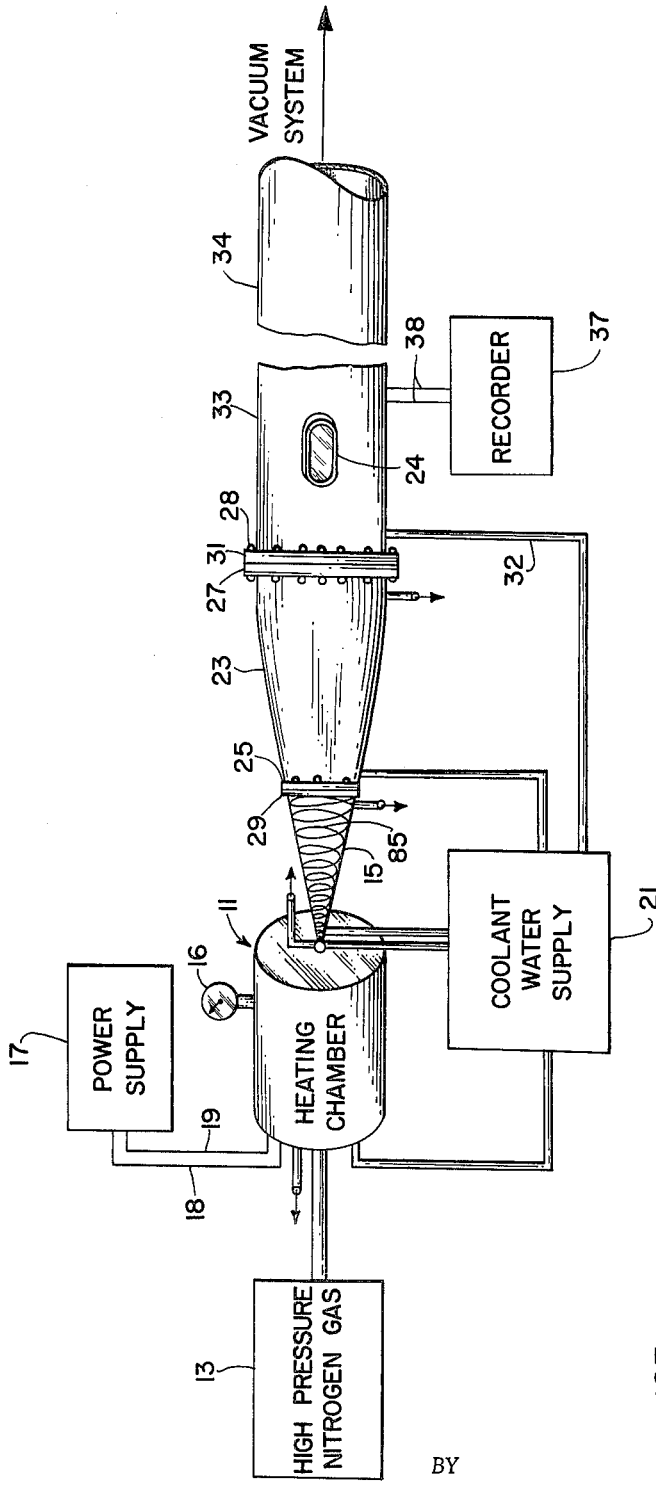
FIG. 1 is a schematic representation of the test facility according to the present invention.

Referring now to the drawings, wherein like reference numerals designate like or corresponding parts throughout the several views, and more particularly to FIG. 1, there is shown a hypersonic test facility having a pressure chamber or heat exchange assembly generally designated by reference numeral 11, connected at one end to a high-pressure gas source 13 with the other end thereof leading to a water-cooled convergent-divergent nozzle 15. A stagnation pressure gage 16 is provided adjacent pressure chamber 11 in fluid communication with the interior thereof for indicating stagnation pressures of the gas within chamber 11. A power supply 17 having suitable leads 18 and 19, as will be further explained hereinafter, serves to supply the current for heating the high-pressure gas as it flows from the compressed source 13 through pressure chamber 11 and nozzle 15. An expansion section 23 provided with suitable circumferential flanges or brackets 25 and 27 is secured by conventional means, such for example bolts 28, to similar flanges 29 and 31 provided respectively about nozzle 15 and test section 33. This assembly leads into a straight-type diffuser section 34 which is in connection with a suitable vacuum system. Indicator and temperature recording mechanism 37 having lead wires 38 leading into test section 33 to connect with a thermocouple contained therein, as will be further explained hereinafter, is also provided adjacent test section 33. Test section 33 is also provided with conventional opposing offset schlieren windows, one of which is shown in FIG. 1 and designated by reference numeral 24, for the visual and photographic observation of a model within the test facility.

A suitable cooling system, such for example pressurized supply 21, serves to supply the coolant fluid necessary for suitable water jackets positioned about expansion section 23, test section 33, nozzle 15, as well as for the induction heating coils contained within pressure chamber 11. The cooling water flows at a rate of approximately three gallons per minute from supply source 21 by way of the illustrated conduits, one of which is designated by reference numeral 32 through the various cooled sections and is drained from the individual sections, as indicated by the small arrows leading from the several conduits shown in FIG. 1, to a suitable waste disposal area.

Figure 2:
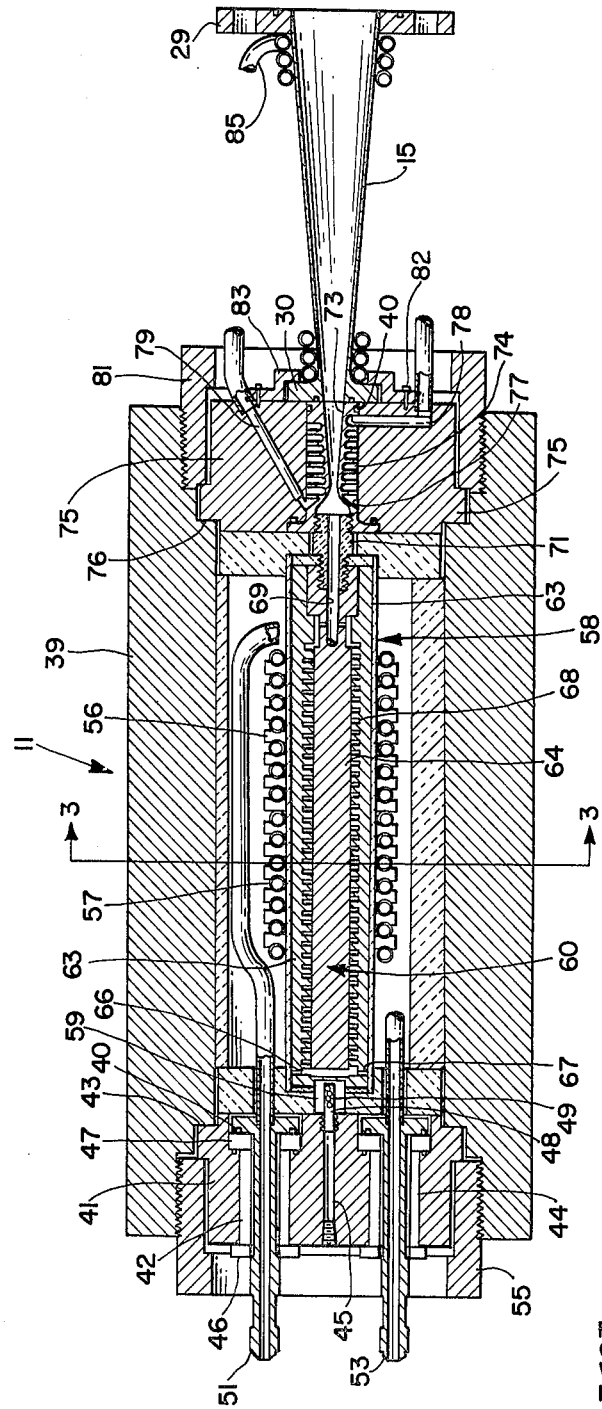
FIG. 2 is a sectional view, taken along line 2—2 of FIG. 3 of the pressure chamber and showing the preferred embodiment of a graphite heater element in position.

Referring now more particularly to FIG. 2, the major components of the heat exchanger assembly 11 according to the present invention includes a relatively thick, stainless steel hollow casing 39 having a design pressure of 5,000 p.s.i. and provided with enlarged recessed stepped portions at the open ends thereof. At the inlet end of casing 39 a slidable head inlet sleeve 41, constructed for example of stainless steel and adapted to rest on shoulder 43 of casing 39, is provided with a central bore 45 serving as a gas inlet leading into casing 39.

Central bore 45 is internally threaded at each end thereof with the inlet end serving to connect to a suitable conduit leading from the pressurized gas source 13 (FIG. 1) and the downstream end threadingly receiving an externally threaded duct 48 formed of a temperature-resistant metal, such for example molybdenum. Duct 48 is provided with a plurality of openings 49 at the downstream end thereof, as will be further explained hereinafter.

Inlet sleeve 41 is also provided with a pair of insulated identical bores for the receipt therethrough of the water-cooled induction heating coil leads 51 and 53.

Leads 51 and 53 are protectively insulated from head sleeve 41 by suitable tubular insulators 42 and 44, respectively. Washers 46 and 47, also formed of suitable insulation material, such for example boron nitride, are positioned at opposite ends of insulator sleeve 42 with identical washers, not designated, being also provided at the ends of sleeve 44. An externally threaded head nut 55, constructed for example of carbon steel, is threadingly received by casing 39 to maintain sleeve 41 therein in engagement with shoulder 43. Leads 51 and 53 extend within casing 39 to join with a unitary, spiral high-pressure water-cooled induction coil 57 positioned spirally around the internal heat exchanger assembly, designated generally by reference numeral 58.

Figure 3:
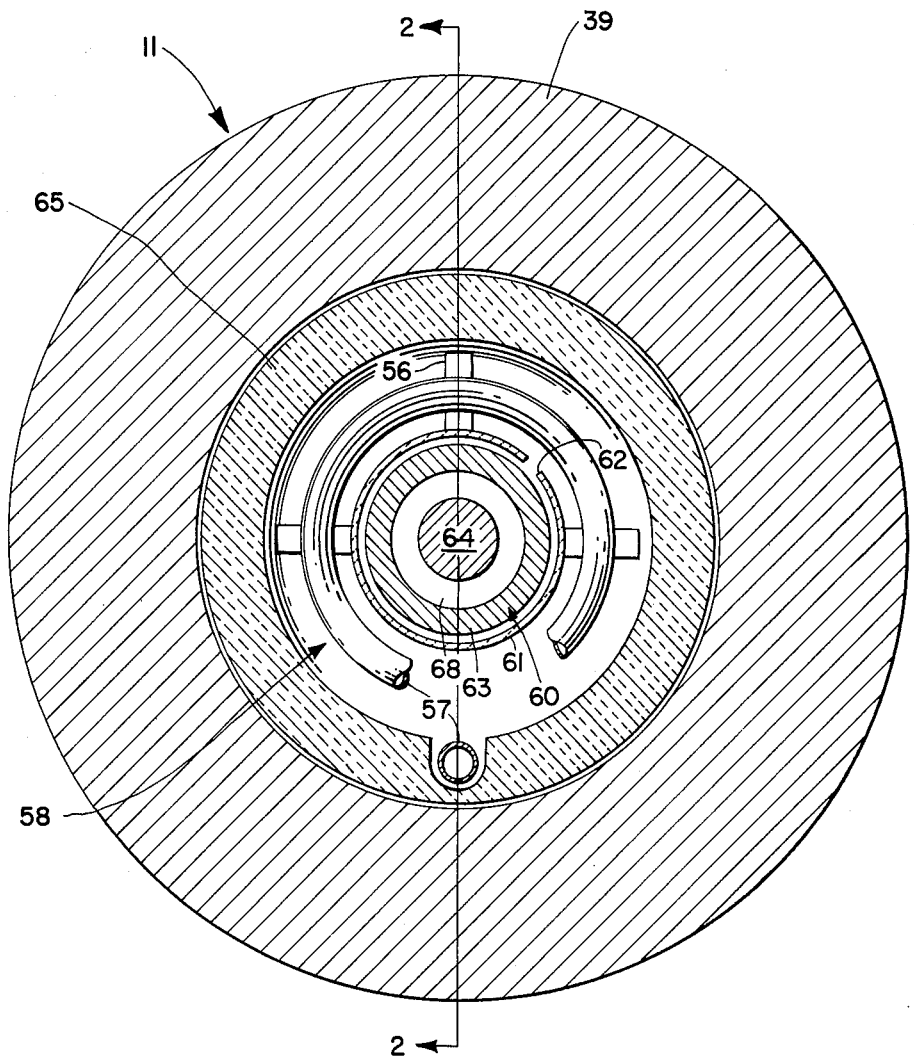
FIG. 3 is enlarged sectional view taken along line 3—3 of FIG. 2.

As shown more particularly in FIG. 3, heat exchanger assembly 58 includes a longitudinally split radiation shield 61, such for example a molybdenum sleeve, encompassing a graphite heater element designated generally by reference numeral 60. The longitudinally extending opening 62 in radiation shield 61 prohibits the flow of current completely around the sleeve to thereby prevent heat destruction of the sleeve while also serving to aid in the flow of gas to graphite heater element 60. Dielectric shielding, formed of boron nitride or other equivalent electrical insulating and heat-resistant material, is circumferentially disposed adjacent radiation shield 61 in the form of plurality of radially extending spacers 56 to provide individual spacer elements for each turn of the water-cooled induction coil 57. The internal cavity of pressure casing 39 is lined with a thick layer of high-temperature insulation 65, such for example as molded alumina insulation in the form of a sleeve and end washers, to keep the temperature of the interior wall of casing 39 within tolerable limits.

Referring now back to FIG. 2, graphite heater element 60 consists of a hollow graphite cylindrical female sleeve 63 having an open and a closed end with a graphite rod 64 positioned within the open end thereof and terminating just short of the closed end of cylinder 63 to form a small cavity 66 therewith. Communication between cavity 66 and the exterior of heater element 60 is maintained by a pair of openings formed in cylinder 63, and one of which is designated by reference numeral 67. Cavity 66 is also in fluid communication with one end of a spiral passageway 68 formed by a machined spiral groove extending substantially along the interior length of cylinder 63 and the smooth exterior surface of graphite rod 64. The other end of passageway 68 leads into a central bore 69 formed in the downstream end of graphite rod 64. Bore 69 terminates in an enlarged threaded opening which receives one end of an externally threaded tubular connector 71 machined from, for example, molybdenum. The bleed end of tubular connector 71 is threadingly received by and in fluid communication with the open-flanged end of an expansion nozzle 73. Thus, tubular connector 71 serves the dual function of rigidly supporting graphite heater element 60 axially centered within casing 39 while also acting as a seal to prevent any unheated high-pressure input gas from entering into expansion nozzle 73.

Expansion nozzle 73 is machined from a substantially cylindrical and heat-conductive material, such for example copper, and is provided on the exterior surface thereof with a spiral groove 74, the function of which will be further described hereinafter.

A slidable head nozzle sleeve 75, formed of a material similar to slidable sleeve 41, abuts against stepped portion 76 of casing 39. Sleeve 75 is provided with an enlarged central stepped bore 77 for slidably receiving flanged nozzle 77 with the surface thereof forming a spiral passageway with groove 74. A pair of openings 78 and 79 are drilled within sleeve 75 to connect with the opposite ends of spiral groove 74 and serve to connect to suitable coolant receiving and discharge conduits, as shown more particularly in FIG. 1. A head nut 81, similar to nut 55 described hereinbefore, is threadingly received within the downstream end of casing 39 to retain slidable head nozzle sleeve 75 and its component parts within casing 39. Suitable silicone O ring seals 40 are provided between the various parts to prevent leakage when casing 39 is pressurized.

As mentioned hereinbefore, copper nozzle 73 leads into and is secured to another divergent nozzle section 15 by suitable bolts 28. Nozzle 15 is maintained in alinement and fluid communication with nozzle 73 in any conventional manner, such for example as by a split ring 83 positioned about flange 30 and bolted by means of suitable bolts 82 within a cavity in the face of nut 81. A cooling coil 85 is also positioned around nozzle 15 and connected in like manner as coil 79 described hereinbefore, and shown more particularly in FIG. 1, to a suitable cooling source and discharge conduit.

Referring now more particularly to FIGS. 4–6, there are shown three modifications of the graphite element 60 which have also been tested and are utilizable in the hypersonic test facility described herein. All of the heater elements, shown in FIG. 2 and FIGS. 4–6, are machined from commercially available grade graphite stock having a density of approximately 1.7 gm./cc. Each of the graphite elements described herein is approximately eleven inches long and one and one-half inches in outside diameter, although these dimensions are given as illustrations only and deviations therefrom are obviously within the scope of this invention. In FIG. 4, the graphite element 60a consists of a hollow cylinder with numerous holes 87 drilled into the walls of the cylinder toward the hollow interior thereof substantially throughout the length of the cylinder. When employing a heater element 60a of this type, the gas is heated as it passes from the top toward the bottom of the element, as viewed in FIG. 4, with the gas passing through the numerous holes 87 from the outside of the cylinder toward the center of the element and then passing down the hollow center for exiting at the aperture designated by reference numeral 88.

The graphite heater element 60b, as shown in FIG. 5 and FIG. 5a, consists of a hollow cylinder into which a plurality of one-inch diameter graphite disks 70 are placed end-to-end. Each disk is provided with a cavity at one end thereof with a plurality of small diameter holes drilled therein along the individual disk length. In heater 60b, the principle of numerous holes is again employed, only the input gas passes through the holes successively from one disk to another and continually experiences heating along the entire length of the element. Thus, when using heater element 60b, the gas enters the element at opening 91 and proceeds along the length of the element to an exit 92.

A further modified graphite heater element 60c is shown in FIGS. 6 and 6a and includes a hollow graphite cylinder 93 having a spiral groove externally machined along the length thereof, and a graphite sleeve 95 telescopingly receiving cylinder 93 so as to form a spiral passageway 94 for the passage therethrough of the test gas. In this embodiment, gas enters ports 96, provided in the sidewall of sleeve 95 so as to communicate with passageway 94, and progresses through spiral passage 94 gaining heat as it moves around the spiral to chamber or cavity 97, formed between the parts 93 and 95, where the flow is reversed for subsequent entrance into the central passageway of male element 93 to exit at opening 98. Due to the relatively low-pressure drop through element 60c, this element has proved able to survive structurally and is quite reliable over a great number of test runs.

In both of the embodiments illustrated in FIGS. 2 and 6, the surface heating condition, which is characteristic of induction heating, is used to maximum advantage. It is also significant to note that by decreasing the longitudinal width, while maintaining the same depth, for the spiral grooves described in reference to FIG. 2 and FIG. 6, results in providing a more wetted area to the gas flow which, theoretically, gives a higher energy input to the gas.

Referring now to FIG. 7, a total-temperature probe 104, which may be employed in the test section 23 of the test facility, is shown. Probe 104 is employed to determine the true stagnation temperature under test conditions and consists essentially of a hollow sting 105 adapted to extend within test chamber 33 and contains the thermocouple reference elements therein. This thermocouple is essentially made up of a boron nitride cylindrical block 107 having a central opening therein in which is positioned a copper reference junction block 109 with an elongated platinum-sheathed thermocouple 110 extending from copper block 109. Thermocouple 110 is provided with a ceramic shield 111 along a portion of the length thereof with a further sleeve of boron nitride 112 positioned around ceramic layer 111 and connecting to sting member 105 at a mating surface with the boron nitride closure 107 provided for sting 105. The exposed end of platinum-sheathed thermocouple 110 which faces into the gas stream when in use, is protected by a double sleeve patinum radiation shield over the tip portion thereof, as designated by reference numeral 113 and 114, with exterior sleeve 113 terminating short of the boron nitride sleeve protective coating 112 and being provided with a plurality of bleed holes 115 about the circumference thereof to permit the gas to flow freely therethrough about the exposed surface of the thermocouple 110 after entering the open end of shield 113–114. The sheathed thermocouple 110 is constructed of a coaxial jacket of platinum and an inner conductor of platinum-rhodium wire. This type of thermocouple eliminates the chance of electrical shorts developing because only one of the lead wires is exposed to the flow of hot gas. In operation of probe 104, a reference temperature reading is taken at the copper reference block prior to beginning a test run by conventional indicator or recorder structure schematically shown in FIG. 1 and designated by reference numeral 35. This reference temperature reading permits any slight correction needed to the reading of the thermocouple probe taken during a test run.

Operation

In operation of the test facility, referring more particularly to FIGS. 1 and 2, the sheathed thermocouple probe 104 is mounted in test chamber 33 of the facility through a suitable opening, not shown, and connected to suitable indicating electrical circuitry, also not shown, in a conventional manner.

The test model on which a hypersonic test is to be conducted is then positioned on a slidable sting mount in a conventional manner through a suitable opening, not shown, in test chamber 33, in such position as to be viewed through schlieren windows 24. The entire facility is connected to the high pressure inert gas source 13, such for example as nitrogen gas cylinders, and the entire system is then evacuated through a conventional vacuum system to a pressure of approximately seventy-five microns of mercury. This vacuum is held on the system for about one hour or longer before each test run. Immediately prior to making a hot run, the system is purged with nitrogen at a pressure of approximately 200 p.s.i. After purging, power is applied to the induction coil 57 through leads 51, 53 from power supply 17 in increments of 20 kw. every 15 seconds until the maximum power of 70 kw. or that desired for a given run is reached. After achieving maximum power, the high pressure inert gas from storage cylinders 13 is passed through a regulator from which the pressure to the heater assembly is manually controlled with a conventional turbine-type flow meter, not shown, continuously recording the mass rate of flow.

The nitrogen gas passes through inlet bore 45, duct 48 and openings 49 where it completely engulfs heat exchanger 58. Since the only exit for the pressurized gas from the interior of casing 39 is by way of hollow connector 71, the gas flows through the slit 62 in shielding 61 and enters holes 67 leading to cavity 66 where it subsequently progresses along spiral passageway 68 and is conductively heated by the hot graphite element 60 before exiting into connector 71. The nitrogen gas enters the pressure chamber at approximately room temperature and is heated upon passing through the hot heater element, when employing a 70 kw. power supply and depending upon which type of hereinbefore described graphite element is used, to a maximum temperature of approximately 3,100° R.

At the completion of a test run, the power supply is disconnected from coil 57 and the entire heater assembly is permitted to cool during which time nitrogen is continuously bled through the system for approximately 15 minutes and then the system is again evacuated.

It is apparent that some expansion of graphite heater 60 will occur during the heated condition and although this expansion is slight, provisions must be made to permit substantially unimpeded longitudinal expansion for safety reasons. As mentioned heretofore, duct 48 extends from gas inlet 45 and, by way of openings 49, permits unhampered passage of the gas into cavity or chamber 59. This is permitted since the downstream end of the duct 48 extends loosely into and terminates short of the depth of the enlarged cavity 59 which is formed along the axis and at the inlet end of graphite element 60. Thus any longitudinal expansion of graphite element 60 will be permitted toward duct 48 without imposing any undue stress on the various heater components. Radial expansion is permitted by the construction of split radiation shield 61 and the flexible nature of copper coil 57.

For all the temperature measurements taken with the use of the hereinbefore described thermocouple probe 104 located in test section 33, the real gas effects are negligible; thus, the stagnation temperature measured in the test section can be assumed to be equal to the stagnation temperature of the gas.

It was also experimentally determined that the input power at 40 and 70 kw. had the effect on the stagnation temperature for various mass flow rates of showing that, as the mass flow is increased, the temperature at 40 and 70 kw. show a divergence. That is, the tendency is for the gas temperature to increase up to a maximum value and then with a further increase in mass rate of flow, the temperature begins to decrease. Thus, with only a 300° R. increase in temperature from 40 to 70 kw. being noted, it would take a sizeable increase in power to give an appreciable increase in stagnation temperature. However, the input power required to produce significant increases in stagnation temperature up to at least 4,000° R. does not exceed the power used in some present-day arc facilities.

Prior to a hot run, the mass rate of flow through the facility was measured for a given stagnation pressure. Maintaining this stagnation pressure, power was applied in increments of 20, 40, 60, and 70 kw. This increase in power steadily heated the gas and, in turn, caused a progressive decrease in the mass rate of flow through the system. One run was made with a 0.036-inch-diameter nozzle throat at a stagnation pressure of 940 p.s.i.a. Two other runs were made using a 0.025-inch-diameter nozzle throat at stagnation pressures of 940 and 1,880 p.s.i.a. All tests were conducted in a 3-inch test section 33 of the facility illustrated in FIG. 1, with the stagnation temperatures being measured with the sheathed thermocouple probe 104 illustrated in FIG. 9.

Obviously, many modifications and variations of the present invention are possible in the light of the above teachings. For example, it is understood also that wherein dimensions and specific materials are mentioned in the foregoing specification that they are used only as illustrative and obvious deviations therefrom are apparent to those skilled in the art and within the scope of the present invention. Also any conventional liquid coolant source and discharge apparatus, such for example as a circulating system, may be used in lieu of the herein described water system. Salient features of the invention do include, however, the use of graphite for the individual heater elements and the use of inert gas for the test fluid to prevent erosion of the graphite elements and contamination of the test medium during the high-temperatures involved. It is therefore to be understood that within the scope of the appended claims the invention may be practiced otherwise than as specifically described.

What is claimed as new and desired to be secured by Letters Patent of the United States is:

1. A heater assembly for pressurizing fluid flow, comprising: a tubular casing having a pressure-resistant exterior wall and an interior passageway for the passage therethrough of a fluid medium, one end of said passageway being connected to a source of pressurized fluid and the other end thereof leading to an expansion nozzle, said expansion nozzle serving as a bleed for said fluid flow, a heater element forming part of said passageway and being so constructed and arranged to transfer heat to said flow of fluid while also preventing contamination thereof, an induction coil exteriorly adjacent said heater element for heating said heater element, a radiation shield disposed between said induction coil and said heater element, electrical insulation means separating the individual turns of said induction coil, thermal insulation means disposed between said coil and said exterior wall, coolant means for said coil, means effecting a pressure-resistant seal at each end of said tubular casing, said last named means including a tubular connector in fluid connection between said heater element and said expansion nozzle for rigidiy supporting said heater element axially centered within said casing and serving as a seal to prevent any unheated pressurized fluid from entering said expansion nozzle, and means integrally formed with said expansion nozzle to facilitate cooling of said expansion nozzle.

2. A heater assembly for pressurized fluid flow, comprising: a tubular casing having a pressure-resistant exterior wall and an interior passageway for the passage therethrough of a fluid medium, one end of said passageway being connected to a source of pressurized fluid and the other end thereof leading to an expansion nozzle, said expansion nozzle serving as a bleed for said fluid flow, a heater element forming part of said passageway for transferring heat to said flow of fluid, an induction coil exteriorly adjacent said heater element for heating said heater element, spacer means separating the individual turns of said induction coil, thermal insulation means disposed between said coil and said exterior wall, coolant means for said coil, means effecting a pressure-resistant seal at each end of said tubular casing; and means integrally formed with said expansion nozzle to facilitate cooling of said expansion nozzle.

3. A heater assembly for pressurized fluid flow comprising: a casing having a pressure-resistant exterior wall and an interior passageway for the passage therethrough of a fluid medium, one end of said passageway being connected to a source of pressurized fluid and the other end thereof leading to an expansion nozzle, said expansion nozzle serving as a bleed for said fluid flow, a heater element forming part of said passageway for transferring heat to said flow of fluid, induction means adjacent said heater element to heat said heater element, means effecting a pressure-resistant seal at each end of said tubular casing, said last named means including a tubular connector in fluid connection with said heater element and said expansion nozzle for rigidly supporting said heater element axially centered within said casing and serving as a seal to prevent any unheated pressurized fluid from entering said expansion nozzle, and mean integrally formed with said expansion nozzle to facilitate cooling of said expansion nozzle.

4. A heater assembly as in claim 3 wherein said heater element is a hollow graphite cylinder having a plurality of spaced, small diameter apertures leading from the exterior surface to the center thereof.

5. A heater assembly as in claim 3 wherein said heater element consists of a hollow cylinder and a plurality of perforated graphite disks disposed in spaced adjacency within said cylinder.

6. A heater assembly as in claim 3 wherein said heater element includes a hollow graphite cylinder having an open and a closed end, a continuous spiral groove extending along the hollow interior of said cylinder and in fluid connection with the exterior environment at said cylinder closed end, a longitudinal graphite rod disposed within said cylinder through the open end thereof, said rod being provided with a conduit leading from the exposed end thereof to connect with said spiral groove within said cylinder.

7. A heater assembly as in claim 3 wherein said heater element consists of a graphite cylinder having a gas inlet end and a downstream exit end, means fixedly attaching said graphite element at said downstream exit to said expansion nozzle, and means at said gas inlet end of said graphite cylinder permitting substantially unimpeded longitudinal expansion of said cylinder when subjected to high temperature conditions.

References Cited by the Examiner

UNITED STATES PATENTS

| | | | |
|---|---|---|---|
| 2,407,562 | 9/1946 | Lofgren | 219—10.51 |
| 2,706,411 | 4/1955 | Bircher | 73—359 |
| 2,798,893 | 7/1957 | Winkler | 136—4 |
| 2,799,159 | 7/1957 | Sabol | 73—147 |
| 2,875,311 | 2/1959 | Harkenrider | 219—10.49 |
| 3,029,635 | 4/1962 | Fetz | 73—147 |
| 3,036,888 | 5/1962 | Lowe | 219—10.49 X |
| 3,116,392 | 12/1963 | Morey | 219—10.49 |

OTHER REFERENCES

Advances in Hypervelocity Techniques, article by Shreeve et al., Plenum Press, New York, pp. 1–25 (March 19, 1962).

RICHARD M. WOOD, *Primary Examiner.*

DAVID SCHONBERG, *Examiner.*

L. H. BENDER, *Assistant Examiner.*